United States Patent
Knapp et al.

(10) Patent No.: US 12,320,095 B2
(45) Date of Patent: Jun. 3, 2025

(54) WORK MACHINE

(71) Applicant: Liebherr-Werk Bischofshofen GmbH, Bischofshofen (AT)

(72) Inventors: Hans Knapp, Bischofshofen (AT); Gerald Heugenhauser, Goldegg (AT); Reinhard Dengg, Tamsweg (AT); David Sagorz, Bad Hofgastein (AT)

(73) Assignee: LIEBHERR-WERK BISCHOFSHOFEN GMBH, Bischofshofen (AT)

( * ) Notice: Subject to any disclaimer, the term of this patent is extended or adjusted under 35 U.S.C. 154(b) by 296 days.

(21) Appl. No.: 18/051,416

(22) Filed: Oct. 31, 2022

(65) Prior Publication Data
US 2023/0167624 A1 Jun. 1, 2023

(30) Foreign Application Priority Data
Nov. 19, 2021 (DE) .................... 10 2021 130 374.5

(51) Int. Cl.
*E02F 9/08* (2006.01)
*B60L 50/70* (2019.01)
(Continued)

(52) U.S. Cl.
CPC ............ *E02F 9/0883* (2013.01); *B60L 50/70* (2019.02); *E02F 9/16* (2013.01); *E02F 9/20* (2013.01); *B60L 2200/40* (2013.01)

(58) Field of Classification Search
CPC ... E02F 9/0883; E02F 9/16; E02F 9/20; E02F 9/2062; E02F 9/2079; B60L 50/70; B60L 2200/40; B60K 2015/03315; B60K 2015/0638; B60K 2015/0639; B60K 15/07; B60Y 2200/415; F02B 33/36; F02B 43/02; F02B 43/10; F02B 53/00; F02B 55/04; F02B 55/14; F04C 18/0215; F04C 23/02; F04C 29/04
See application file for complete search history.

(56) References Cited

U.S. PATENT DOCUMENTS

| | | | | |
|---|---|---|---|---|
| 4,059,281 A | * | 11/1977 | Evans | B60K 15/07 180/69.2 |
| 6,676,163 B2 | * | 1/2004 | Joitescu | B60K 15/07 280/834 |

(Continued)

FOREIGN PATENT DOCUMENTS

| | | | | |
|---|---|---|---|---|
| CN | 110217116 A | * | 9/2019 | ............. B60K 15/03 |
| CN | 112776592 A | * | 5/2021 | ........... B60K 15/063 |

(Continued)

OTHER PUBLICATIONS

Translated CN-110217116-A (Year: 2024).*

*Primary Examiner* — James A Shriver, II
*Assistant Examiner* — Ian Bryce Shelton
(74) *Attorney, Agent, or Firm* — McCoy Russell LLP

(57) ABSTRACT

The present invention relates to a work machine, in particular a wheeled loader, having a cabin for the operator of the work machine and having an engine room arranged behind the cabin, wherein the work machine has a drive that is operable with hydrogen; and in that one or more tanks for the reception of hydrogen are present, with the tank or tanks being arranged in a hydrogen fuel system behind the cabin and above the engine room.

15 Claims, 3 Drawing Sheets

(51) Int. Cl.
*E02F 9/16* (2006.01)
*E02F 9/20* (2006.01)

(56) References Cited

U.S. PATENT DOCUMENTS

| | | | | |
|---|---|---|---|---|
| 7,000,716 B2* | 2/2006 | Leifert | ............... | B66F 9/07572 |
| | | | | 180/65.265 |
| 7,284,627 B2* | 10/2007 | Leifert | ............... | B66F 9/07572 |
| | | | | 180/68.5 |
| 8,919,474 B2* | 12/2014 | Masuda | ............... | E02F 9/0833 |
| | | | | 180/89.1 |
| 9,228,322 B2* | 1/2016 | Keys | ..................... | E02F 9/2079 |
| 9,441,527 B2* | 9/2016 | Kamimae | ............. | E02F 9/0833 |
| 11,273,717 B2* | 3/2022 | Miyaki | ............... | H01M 8/2475 |
| 11,988,339 B2* | 5/2024 | Woo | ........................ | E02F 9/207 |
| 12,091,300 B2* | 9/2024 | Woo | ........................ | F17C 13/08 |
| 2002/0171236 A1* | 11/2002 | Joitescu | ................. | B60K 15/07 |
| | | | | 280/834 |
| 2004/0129466 A1* | 7/2004 | Leifert | .................. | B60K 15/07 |
| | | | | 180/65.25 |
| 2006/0137930 A1* | 6/2006 | Leifert | .................... | B60L 50/71 |
| | | | | 180/305 |
| 2009/0095441 A1* | 4/2009 | Masunoya | ............. | E02F 9/0883 |
| | | | | 165/41 |
| 2014/0000973 A1* | 1/2014 | O'Donnell | ................. | E02F 9/18 |
| | | | | 180/9.42 |
| 2014/0069972 A1* | 3/2014 | Willemsen | ........... | B60K 15/063 |
| | | | | 224/401 |
| 2015/0123393 A1* | 5/2015 | Jackson | ................ | B60K 15/07 |
| | | | | 280/834 |
| 2020/0238839 A1* | 7/2020 | Miyaki | ................... | B60L 50/71 |
| 2022/0194218 A1* | 6/2022 | Woo | .................... | B66F 9/07518 |
| 2022/0243873 A1* | 8/2022 | Woo | ........................ | E02F 9/207 |
| 2023/0019714 A1* | 1/2023 | Takaki | ..................... | F17C 1/04 |

FOREIGN PATENT DOCUMENTS

| | | | | | |
|---|---|---|---|---|---|
| EP | 1398201 A2 | * | 3/2004 | ................ | B60K 1/04 |
| KR | 20110009732 U | * | 10/2011 | | |
| KR | 101179617 B1 | * | 9/2012 | | |
| KR | 20130131784 A | * | 12/2013 | | |
| WO | WO-2018234810 A1 | * | 12/2018 | ................ | E02F 9/08 |
| WO | WO-2021065404 A1 | * | 4/2021 | ........... | B60G 17/005 |
| WO | WO-2021241526 A1 | * | 12/2021 | ............ | E02F 3/437 |
| WO | WO-2022022855 A1 | * | 2/2022 | ................ | B60K 1/04 |

* cited by examiner

WORK MACHINE

CROSS REFERENCE TO RELATED APPLICATION

The present application claims priority to German Patent Application No. 10 2021 130 374.5 filed on Nov. 19, 2021. The entire contents of the above-listed application are hereby incorporated by reference for all purposes.

TECHNICAL FIELD

The present invention relates to a work machine, in particular to a wheeled loader, having a cabin for the operator of the work machine and having an engine room arranged behind the cabin.

BACKGROUND

It is known from the prior art to design wheeled loaders with a cabin for the operator of the work machine and with an engine room, with a diesel engine that serves the propulsion of the work machine being located in the engine room.

SUMMARY

In the course of decarbonization, the question of alternative energy sources such as hydrogen also arises in the field of work machines. Its use has not been established either in passenger cars or utility vehicles. The few known designs provide an arrangement of the hydrogen fuel system at the center of the vehicle to provide the best possible protection of the tank from external effects.

It is the underlying object of the present invention to further develop a work machine of the initially named kind such that it is particularly suitable for the use of alternative energy sources, in particular of hydrogen.

This object is achieved by a work machine having the features of claim 1. Provision is accordingly made that the work machine has a drive that is operable with hydrogen and that one or more tanks for the reception of hydrogen are present, with the tank or tanks being arranged in a hydrogen fuel system behind the cabin and above the engine room. Preferably, this drive is or comprises a drive that serves the propulsion of the work machine, i.e. a traction drive.

This arrangement of the hydrogen tank or tanks in the hydrogen fuel system allows the best possible utilization of the construction space while completely or largely maintaining the external vehicle dimensions of a wheeled loader or of a different work machine having a diesel engine.

A spatial separation of the hydrogen fuel system from the hot and ignitable surrounding conditions within the engine room is achieved due to the arrangement of the hydrogen fuel system above the engine room. There is thus the greatest possible safety in the event of a tank leak since the hydrogen fuel system is above the engine room.

A further advantage of this arrangement comprises the good accessibility of the hydrogen fuel system and the possibility of protecting the latter sufficiently from damage.

The arrangement of the hydrogen fuel system behind the cabin is per se disadvantageous under certain circumstances to the extent that the field of view of the machine operator may be restricted to the rear. This problem can, on the one hand, be remedied by the use of cameras and/or sensors for the detection of the area not visible to the machine operator.

It is, however, particularly advantageous if the engine room or its cover is configured as narrowed to improve the view of the machine operator.

In this respect, the narrowing is preferably at one or both sides of the engine room or its cover. This brings about the advantage that sufficient visibility of the ballast edge is made possible for the machine operator looking to the rear so that safe maneuverability is provided despite the obstruction of sight of the hydrogen fuel system.

In this case, additional cameras and/or sensors for the detection of the area behind the work machine can be dispensed with, which brings about corresponding cost advantages.

The kind of storage of hydrogen is arbitrary. The tank can, for example, be suitable for storing hydrogen in liquid and/or gaseous form and/or in a bound form.

The hydrogen fuel system is already protected by its elevated position on the engine room or on its cover. It is particularly advantageous if cladding is additionally present that completely or partially surrounds the hydrogen fuel system.

It is preferred if there is no other component of the work machine above the hydrogen fuel system. This has the substantial advantage that hydrogen can escape upwardly without obstruction in the event of a leak and does not come into contact with a component of the work machine. The likelihood of the ignition of escaping hydrogen by an engine component that may be hot is thereby minimized.

The implementation of the tank arrangement hereby described makes it possible to take along a comparatively large amount of hydrogen on the unit and the relevant guidelines and standards with respect to the tank installation and the safety of the hydrogen system can particularly be observed by this tank arrangement. A time of use of the work machine that is as long as possible can only thus be ensured, also without refueling.

The term of a "drive that is operable with hydrogen" is not to be understood as restrictive such that a hydrogen internal combustion engine is meant even though this is also covered by the invention. It is, for example, conceivable that the work machine has a fuel cell for the generation of electrical energy by means of hydrogen and/or has a hydrogen combustion engine.

The propulsion of the work machine is preferably made possible by hydrogen. A drive is conceivable comprising a fuel cell system and an electrified drive train, preferably as a replacement for the diesel engine used in known work machines.

It is conceivable that the work machine does not have a combustion engine for diesel fuel or gasoline as a traction drive for the work machine.

The case is also covered by the invention that the work machine has a combustion engine for diesel fuel or gasoline as a traction drive for the work machine and additionally has a drive operable with hydrogen as the traction drive of the work machine (dual fuel system).

Provision can be made for the purpose of maintenance and/or replacement that the components of the hydrogen fuel system are not fixedly connected to the work machine, but are replaceable.

The hydrogen fuel system or its cladding is preferably dimensioned such that it does not project laterally and/or to the rear and/or to the front beyond the engine room.

The number, arrangement, and shape of the tanks is arbitrary. The use of elongate tanks that are arranged lengthwise or transversely to the direction of travel of the work machine is conceivable.

The hydrogen fuel system can comprise or consist of one or more of the components:
tank for receiving hydrogen or containing hydrogen;
valve
piping.

Said piping serves, for example, the connection of tank or tanks to one or more valves and/or to connect a supply line leading to the drive and/or to connect tanks to one another, etc.

The present invention comprises both a work machine whose tanks are partially or completely filled with hydrogen and a work machine having tanks that are not filled with hydrogen.

It is pointed out at this point that the terms "a" and "one" do not necessarily refer to exactly one of the elements, even though this represents a possible embodiment, but can also designate a plurality of elements. The use of the plural equally also includes the presence of the element in question in the singular and, conversely, the singular also includes a plurality of the elements in question.

Further details and advantages of the invention will be explained in more detail with reference to an embodiment shown in the drawing.

BRIEF DESCRIPTION OF THE FIGURES

There are shown.

DETAILED DESCRIPTION

Figure 1:
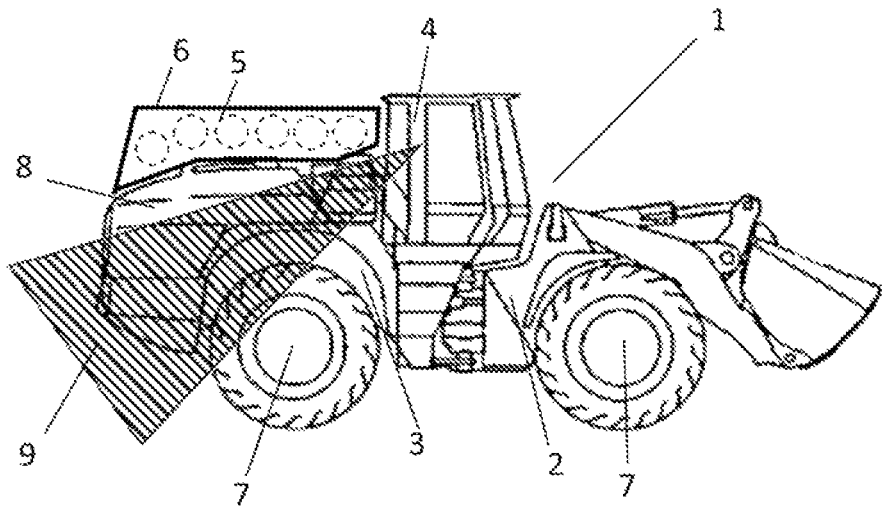
FIG. 1: a schematic side view of a wheeled loader from the right.
Figure 2:
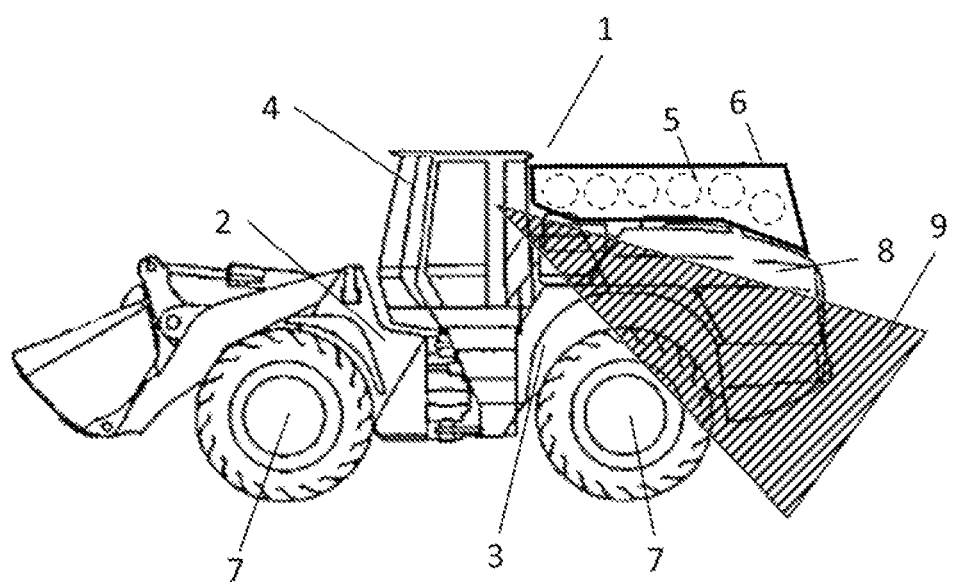
FIG. 2: a schematic side view of a wheeled loader from the left.

FIGS. 1 to 2 show side views of an embodiment of the wheeled loader 1 in accordance with the invention.

The wheel loader 1 has a front part 2 and a rear part 3 that are connected to one another by an articulated joint.

The cabin is marked by the reference numeral 4.

The engine room 8 that inter alia has the drive technology of the wheeled loader for driving the drive axles 7 of the wheeled loader 1 is located in the rear part.

As can be seen from FIGS. 1 and 2, the hydrogen fuel system comprising a plurality of individual tanks 5 is located behind the cabin 4 and above the engine room 8. Said hydrogen fuel system is surrounded at all sides by protective cladding 6.

The cladding or the hydrogen fuel system extends substantially up to the cabin roof and/or over the entire width of the cabin.

9 designates the field of view of the machine operator to the rear.

Figure 3:
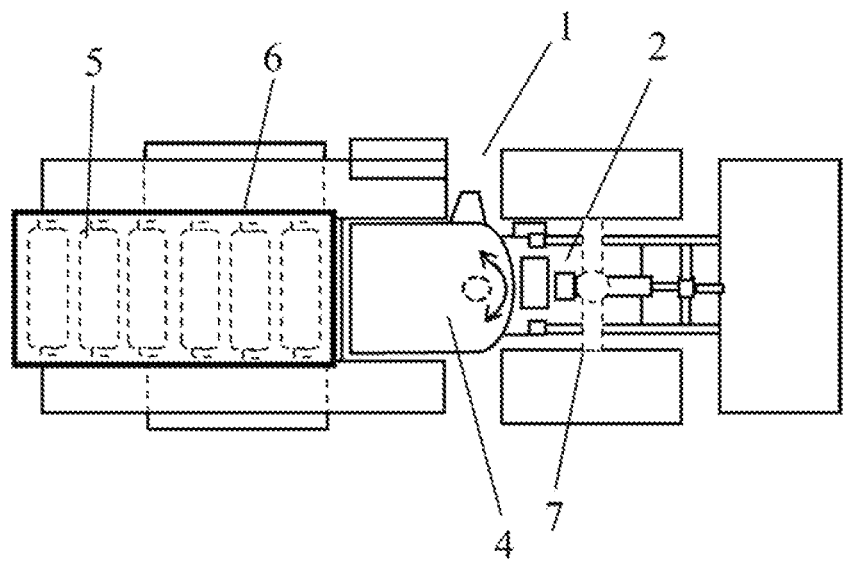
FIG. 3: a schematic plan view of the wheeled loader.

FIG. 3 shows a plan view of the wheeled loader in accordance with FIG. 1 and illustrates the exemplary design in which a plurality of tanks 5 are arranged behind one another transversely to the direction of travel.

The double arrow around the articulated joint shown by dashed lines illustrates the movability of the front and rear parts relative to one another.

Figure 4:
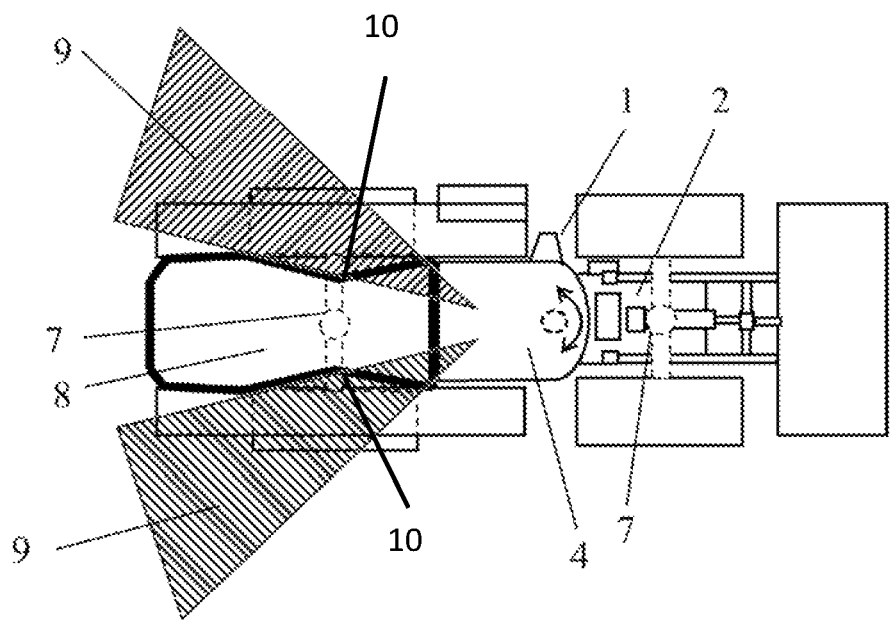
FIG. 4: a schematic plan view of the wheeled loader in a sectional plane beneath the hydrogen fuel system with a field of vision of the machine operator to the rear.

A plan view without a hydrogen fuel system or in a sectional plane beneath the hydrogen fuel system can be seen from FIG. 4.

As can be seen from FIG. 4, the cladding of the engine room 8 has an indentation 10, i.e. a narrowing, at both sides that is triangular in a plan view and that allows the machine operator to have sufficient visibility to the rear despite the hydrogen fuel system. The field of view of the machine operator to the rear is marked by reference numeral 9.

This indentation 10 preferably extends at both sides of the engine room or from its cladding.

This indentation 10 preferably extends over the entire height of the engine room or from its cladding.

Figure 5:
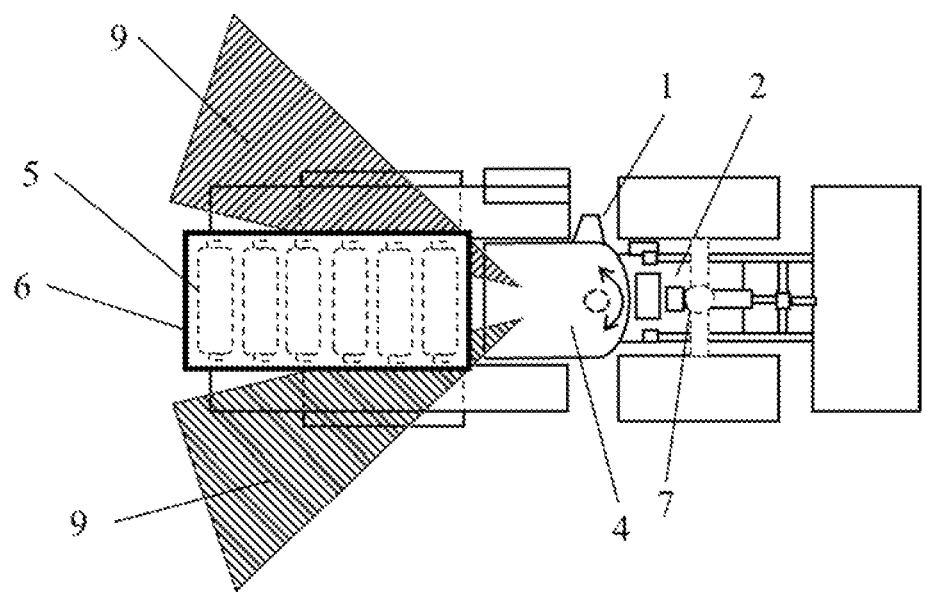
FIG. 5: a schematic plan view of the wheeled loader with a field of vision of the machine operator to the rear.

FIG. 5 shows the arrangement in accordance with FIG. 4, however with tanks 5. It can be seen from FIG. 5 that the field of view 9 to the rear in accordance with FIG. 4 is not restricted by the hydrogen fuel system or its cladding due to the narrowing.

The invention claimed is:

1. A work machine, having a cabin for the operator of the work machine and having an engine room arranged behind the cabin, wherein the work machine has a drive that is operable with hydrogen; and wherein one or more tanks for the reception of hydrogen are present, with the tank or tanks being arranged in a hydrogen fuel system behind the cabin and directly above the engine room.

2. The work machine in accordance with claim 1, wherein the engine room is configured as narrowed to improve the view of the machine operator.

3. The work machine in accordance with claim 2, wherein the narrowing is present at one side or at both sides of the engine room.

4. The work machine in accordance with claim 2, wherein no camera and/or sensor is/are arranged by means of which images or signals behind the work machine can be transmitted to the machine operator.

5. The work machine in accordance with claim 1, wherein the hydrogen fuel system is suitable to store hydrogen in liquid and/or gaseous form and/or in bound form.

6. The work machine in accordance with claim 1, wherein a structure is present that protects against mechanical influences and that at least partially surrounds the hydrogen fuel system.

7. The work machine in accordance with claim 1, wherein a protective cladding is present that at least partially surrounds the hydrogen fuel system, and wherein the protective cladding extends up to a roof of the cabin and over an entire width of the cabin.

8. The work machine in accordance with claim 1, wherein no other component of the work machine that may represent an ignition source is located above the hydrogen fuel system, the ignition source being a source where escaping hydrogen can be ignited.

9. The work machine in accordance with claim 1, wherein the work machine has a fuel cell for the generation of electrical energy by means of hydrogen and/or has a hydrogen combustion engine.

10. The work machine in accordance with claim 1, wherein the work machine does not have any combustion engine for diesel fuel or gasoline to drive the work machine.

11. The work machine in accordance with claim 1, wherein the components of the hydrogen fuel system are not fixedly connected to the work machine, but are replaceable.

12. The work machine in accordance with claim 1, wherein the hydrogen fuel system at least partially forms a preinstallation assembly, the preinstallation assembly being part of the hydrogen fuel system assembled before the parts are installed.

13. The work machine in accordance with claim 11, wherein the hydrogen fuel system comprises one or more of the components of a tank for the receiving of hydrogen or containing hydrogen; valve; or piping.

14. The work machine in accordance with claim 1, wherein the work machine has a combustion engine for diesel fuel or gasoline to drive the work machine in addition to the drive operable by hydrogen.

15. The work machine in accordance with claim 11, wherein the hydrogen fuel system comprises one or more of the components of a tank for the receiving of hydrogen or containing hydrogen; valve; or piping.

\* \* \* \* \*